United States Patent
Marchetti et al.

(10) Patent No.: US 11,090,732 B2
(45) Date of Patent: Aug. 17, 2021

(54) TOOL HOLDER FOR TURRET LATHE

(71) Applicant: M.T. S.R.L., San Giovanni in Marignano (IT)

(72) Inventors: Gianluca Marchetti, San Giovanni in Marignano (IT); Paolo Leonardi, Misano Adriatico (IT)

(73) Assignee: M.T. S.R.L., San Giovanni in Marignano (IT)

( * ) Notice: Subject to any disclaimer, the term of this patent is extended or adjusted under 35 U.S.C. 154(b) by 0 days.

(21) Appl. No.: 16/554,184

(22) Filed: Aug. 28, 2019

(65) Prior Publication Data
US 2020/0078869 A1   Mar. 12, 2020

(30) Foreign Application Priority Data

Sep. 6, 2018   (IT) .......................... 102018000008378

(51) Int. Cl.
*B23B 29/24*   (2006.01)
*B23Q 5/04*   (2006.01)

(52) U.S. Cl.
CPC ........ *B23B 29/242* (2013.01); *B23B 2210/02* (2013.01); *B23Q 5/045* (2013.01); *B23Q 2220/002* (2013.01)

(58) Field of Classification Search
CPC .......... B23Q 5/10; B23Q 5/04; B23Q 1/5406; B23B 29/323
See application file for complete search history.

(56) References Cited

U.S. PATENT DOCUMENTS

| | | | | |
|---|---|---|---|---|
| 4,499,650 A | * | 2/1985 | Cannon .............. | B23Q 3/15526 483/3 |
| 4,576,069 A | * | 3/1986 | Bazuin .................. | B23Q 11/08 408/2 |
| 5,251,511 A | * | 10/1993 | Muendlein ........ | B23B 29/03403 82/1.2 |
| 5,421,072 A | * | 6/1995 | Kuban .................. | B23Q 16/06 29/38 A |

(Continued)

FOREIGN PATENT DOCUMENTS

| | | | |
|---|---|---|---|
| DE | 4308419 A1 | 9/1994 | |
| EP | 1197291 A1 * | 4/2002 | ......... B23Q 17/2233 |

(Continued)

OTHER PUBLICATIONS

Italian Search Report and Written Opinion of the International Searching Authority Application No. IT 201800008378 Completed: May 8, 2019 7 pages.

*Primary Examiner* — Nicole N Ramos
(74) *Attorney, Agent, or Firm* — Whitmyer IP Group LLC

(57) ABSTRACT

Rotating tool holder mountable on a revolving multi-station tool holder turret of a numerically controlled lathe or turning/milling center, the tool holder including a support body that is removably fixable to the turret and including a shaft that is rotatable around a rotation axis and releasably connectable to a drive of said turret, the tool holder further including a motorized drive arrangement that rotates a main body with respect to the support body around a rotation axis autonomously and independently of the rotation of the shaft, in order to position a seat of a cutting/drilling tool, provided on the main body, in a preset angular position.

9 Claims, 13 Drawing Sheets

(56) References Cited

U.S. PATENT DOCUMENTS

| | | | | |
|---|---|---|---|---|
| 5,499,963 | A * | 3/1996 | Fujimoto | B23Q 3/15706 |
| | | | | 483/54 |
| 5,632,075 | A * | 5/1997 | De Bernardi | B23Q 5/045 |
| | | | | 29/40 |
| 5,846,036 | A * | 12/1998 | Mizoguchi | B23Q 13/00 |
| | | | | 409/134 |
| 6,016,729 | A * | 1/2000 | Pfeifer | B23B 3/168 |
| | | | | 82/121 |
| 7,395,589 | B1 * | 7/2008 | Kuo | B23B 29/242 |
| | | | | 29/33 J |
| 2009/0133545 | A1 * | 5/2009 | Tanaka | B23Q 17/20 |
| | | | | 82/121 |
| 2012/0168190 | A1 * | 7/2012 | Linder | B23Q 16/025 |
| | | | | 173/50 |
| 2012/0205880 | A1 * | 8/2012 | Fronius | B23Q 17/10 |
| | | | | 279/126 |
| 2015/0040732 | A1 * | 2/2015 | Ozawa | B23B 29/323 |
| | | | | 82/121 |
| 2015/0190897 | A1 * | 7/2015 | Murota | B23Q 3/15534 |
| | | | | 483/69 |
| 2017/0113313 | A1 * | 4/2017 | Aoyagi | B23Q 5/04 |

FOREIGN PATENT DOCUMENTS

| | | |
|---|---|---|
| EP | 3127639 A1 | 2/2017 |
| WO | 2015145345 A1 | 10/2015 |

* cited by examiner

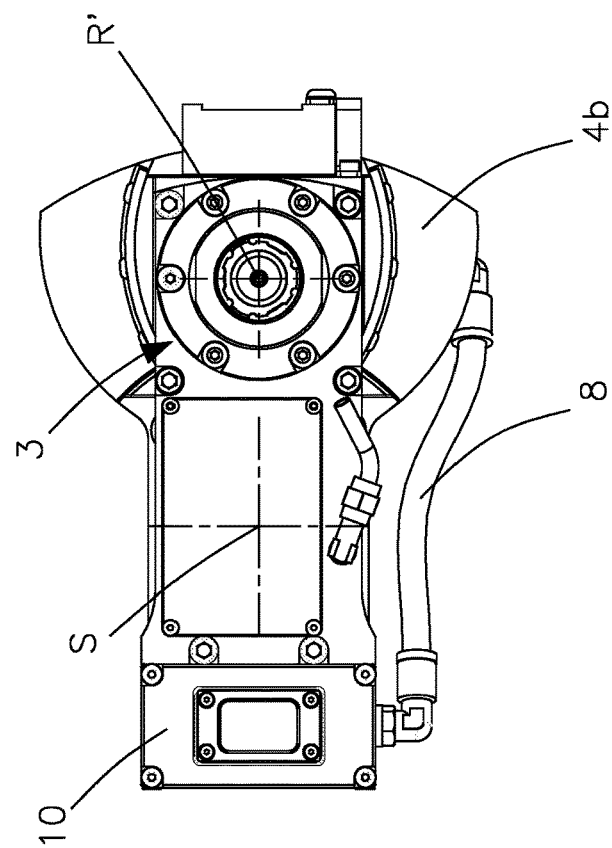
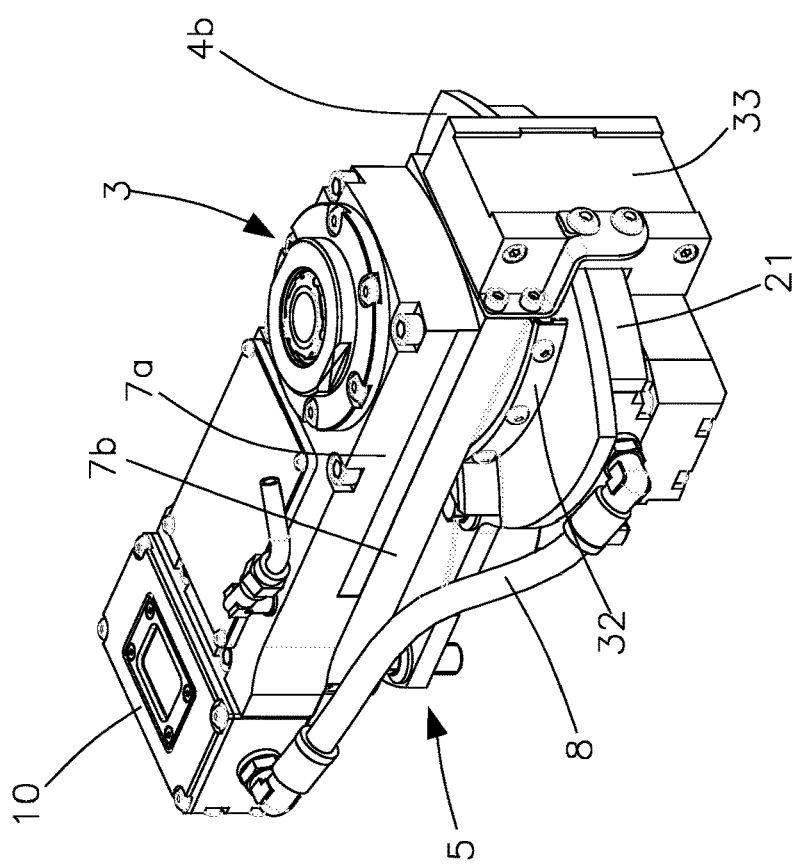
Fig. 6B
Fig. 6A

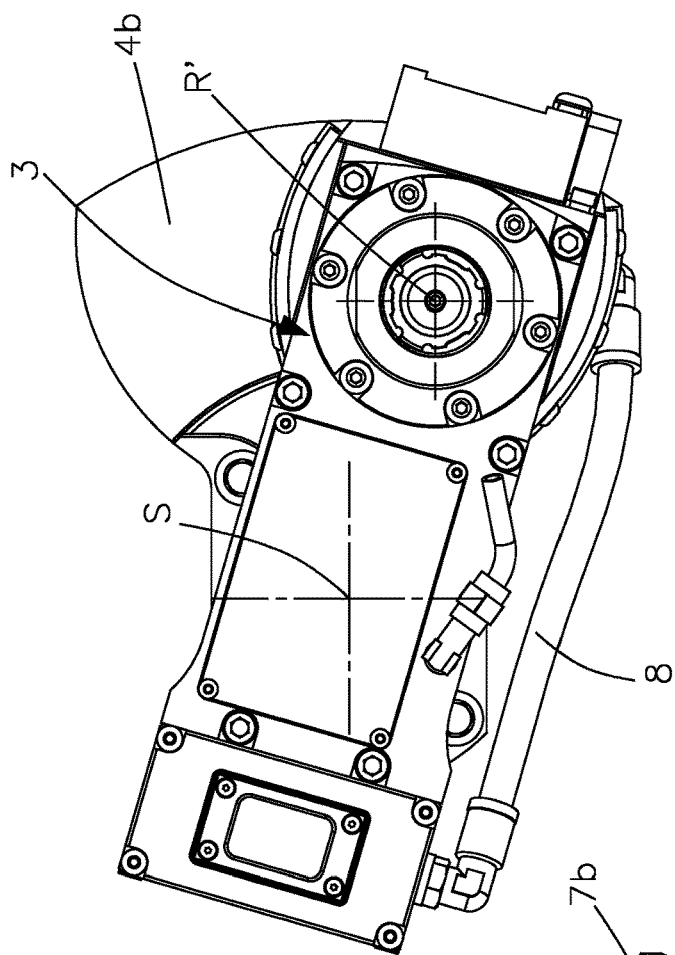
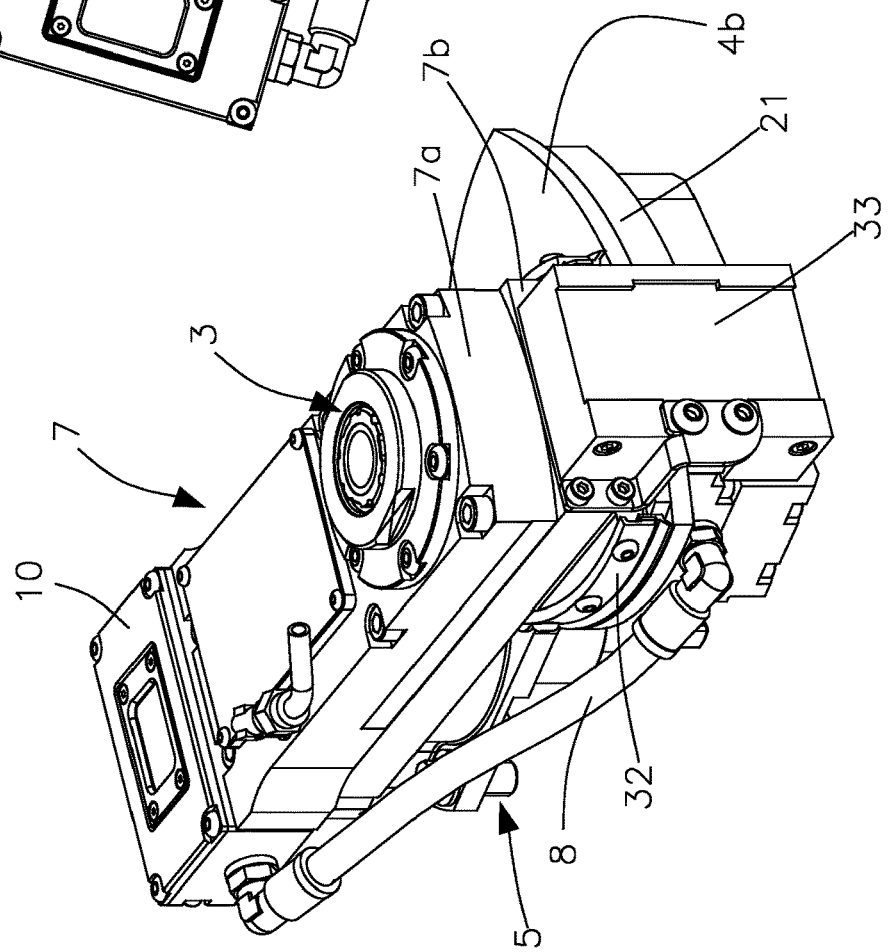
Fig. 8B
Fig. 8A

TOOL HOLDER FOR TURRET LATHE

BACKGROUND OF THE INVENTION

The invention relates to a tool holder mountable on a tool holder turret of a numerically controlled lathe or turning/milling center provided with a revolving multi-station turret.

Specifically, but not exclusively, the invention can be applied for using a tool holder mounted on a tool holder turret to add at least one tool positioning axis.

It is already known that today lathes have become veritable machining centers in which it is possible to perform turning, drilling, boring, tapping and so on.

It is further known to skilled persons that numerically controlled lathes are provided with one or more motorized tool holder turrets that can be driven to move in a three-dimensional machining space. With reference to FIG. 1, a numerically controlled lathe of known type is disclosed, in which a tool holder turret, on which a machining tool is mounted (which is not illustrated), can be driven to move along an axial direction (indicated by the Z axis), normally the rotation axis of the workpiece, along a direction that is perpendicular to the Z axis (indicated by the X axis), normally the direction that is radial to the workpiece, and along a direction that is perpendicular to the plane defined by the Z-X axes (indicated by the Y axis). In this manner, it is possible to perform a machining task on a workpiece, for example making a hole, in any position.

In the context of the invention, the phrase "performing a machining task in any position", means performing a chip-removing machining task, for example drilling on a workpiece mounted on the lathe, in which the axis of the hole made does not lie on the Z-X plane with the rotation axis of the workpiece or intersecting with the Z axis to form an angle comprised between 0 and 180 degrees.

In fact, with reference to FIGS. 2A and 2B shown by way of example, a hole F is shown on a surface of a cylindrical workpiece, the axis of the aforesaid hole F being able to be arranged on a point of the circumference and not necessarily on a plane containing the rotation axis Z of the workpiece. In the same manner, a hole B is shown that lies on the Z-X plane and is tilted with respect to the Z axis.

Nevertheless, not all the numerically controlled lathes are provided with at least one turret that is drivable for moving in three directions owing to the often limited available spaces and because of the high cost.

For this reason, one possible solution, which is already known to skilled persons and alternative to what has just been disclosed, relates to a tool holder module that is orientable and mountable on a tool holder turret that can be driven for moving along the X and Z axes (as defined before), the aforesaid tool holder module being adjustable for adding a positioning axis of a cutting tool to a numerically controlled lathe.

In this connection, patent publication WO 2015/145345 A1 discloses a tool holder according to the preamble of claim 1.

Specifically, the patent publication discloses an orientable tool holder module that is mountable on a tool holder turret, the aforesaid tool holder module comprising a support body that is removably fixable to the tool holder turret, a main body that is rotatably connected to the support body for supporting a cutting tool, for example a drilling tip, and an indicator element suitable for indicating a corresponding angular position between the main body and the support body. The support body is fixable by screws to the tool holder turret. The tool holder module is of motorized type to rotate the drilling tip, inasmuch as it is provided with a drive shaft that is releasably connectable to a drive of a tool holder turret. The main body is rotatable, with respect to the support body, around a rotation axis that is perpendicular to a drive axis of the drive shaft. In use, to adjust the angular position of the main body with respect to the support body, it is necessary to loosen the fixing screws, manually rotate the main body with respect to the support body around the rotation axis of the aforesaid main body by a desired angle and retighten the fixing screws. By adjusting the angular position of the main body with respect to the support body it is possible to perform a machining task in any angular position of the Z-X plane on the workpiece.

Nevertheless, it is not possible to change the position of the main body with respect to the support body simply, fast and accurately. In certain cases, it is necessary in fact to disassemble the entire tool holder module from the turret, interrupting the operation of the machining centre. Although the adjustment is assisted by the indicator element indicating an angular position between the main body and the support body, it is still a manual and thus slow adjustment.

Further, if it is intended to perform multiple drilling tasks on the base surface of the workpiece in several positions (for example two or more holes as shown in FIG. 2A), it becomes necessary to interrupt several times the operation of the lathe to adjust the angular position of the main body with respect to the support body. The aforesaid operations are slow and laborious to perform, i.e. involves prolonged machine downtime, with a consequent reduction of lathe productivity.

SUMMARY OF THE INVENTION

One object of the present invention is to improve tool holders of known type, in particular the tool holders provided with adjustment of the position of the seat intended for the tool.

One object of the invention is to provide a rotating tool holder in which it is possible to adjust simply, fast and accurately in an angular position the seat intended for the machining tool.

One object of the invention is to adjust the tool holder in an angular position independently of the drive of a machining tool mounted on the aforesaid tool holder.

One advantage is to be able to automatically adjust the angular position of the tool holder, without the intervention of an operator.

One advantage is to be able to automatically adjust the angular position of the tool holder, without prolonged machine downtime.

One advantage is driving the adjustment of the angular position of the tool holder independently with respect to the drive of the machining tool.

Another advantage is driving the adjustment of the angular position of the tool-holder at any instant, also during machining of another tool.

Such objects and advantages, and still others, are achieved by a rotating/orientable tool holder according to one or more of the claims provided.

In one embodiment, a rotating tool holder mountable on a tool holder turret of a numerically controlled lathe or turning/milling center comprises a support body, which is fixable to said turret, provided with a shaft that is rotatable around a rotation axis and releasably connectable to a drive of the tool holder turret.

The tool holder can further comprise a main body connected to the support body and rotatable with respect to the support body around a rotation axis.

On the main body, a seat can be obtained that is intended to house a chip-removing tool, i.e. a cutting/drilling tool.

The tool holder comprises a motorized drive arrangement that is drivable to rotate the main body with respect to the support body in order to position the aforesaid seat, for example at a preset angular distance with respect to a preset angular reference position.

The motorized drive arrangement can rotate the main body around the aforesaid rotation axis autonomously and independently of the rotation of said shaft and of external electrical connections.

BRIEF DESCRIPTION OF THE DRAWINGS

The invention can be better understood and implemented with reference to the attached drawings that illustrate one embodiment by way of non-limiting example, in which:

FIGS. 6A, 7A and 8A show perspective views of some configurations that the tool holder can take on in use, for example a rest position, a first angular end position or a second angular end position;

FIGS. 6B, 7B and 8B show the plan views of the configurations of FIGS. 6A, 7A and 8A;

DETAILED DESCRIPTION

Figure 1:
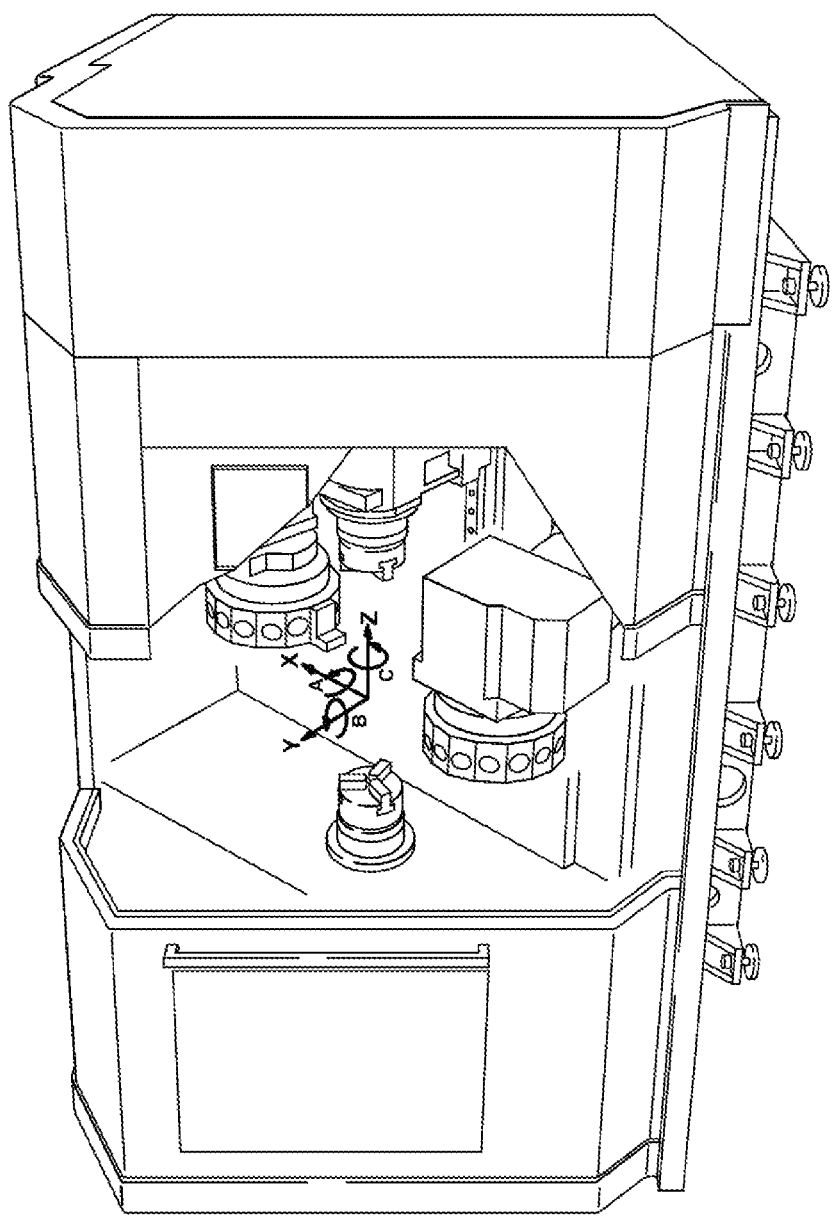
FIG. 1 shows a numerically controlled lathe of known type in which a tool holder turret can be driven to move along three directions.
Figure 2A:
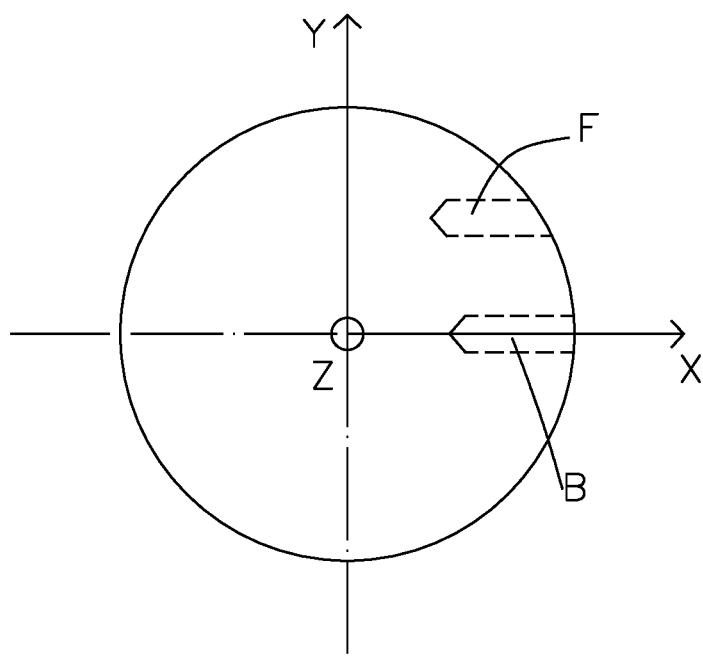
FIGS. 2A and 2B show an example of a drilling machining task on a base surface of a workpiece in any position with respect to the rotation axis.
Figure 2B:
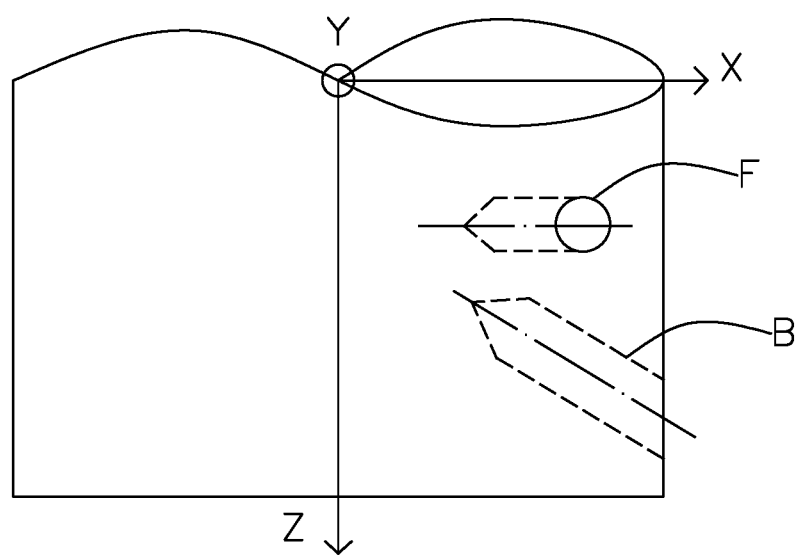

In the description of the invention similar elements of different embodiments shall be indicated by the same numeric reference.

With reference to FIGS. 3A, 3B, 4A, 4B, 5 and 9, a first embodiment is shown of a tool holder 1 of rotating type, mountable on a revolving multi-station turret 2, for example of the type with ten stations, of a numerically controlled lathe that is commercially known and is not shown. In other embodiments the number of stations of the turret can be other than ten.

The tool holder 1 has suitable dimensions for being mountable on the turret 2 and for the overall dimensions of the lathe being respected.

The tool holder 1 can comprise a support body 5 that can be fixable to the aforesaid turret 2. The support body 5 can comprise a flat support plate 4.

In the embodiment of the aforesaid figures, the support plate 4 can have a substantially flared shape, i.e. having a first portion 4a of plate that is less wide than a second portion 4b of plate. In other embodiments that are not illustrated the support plate 4 can have any other shape.

On the first portion 4a, a first through hole 19 (FIG. 5) can be provided that is sized for inserting a shaft 6. The shaft 6 extends along, and rotates around, a rotation axis R and comprises a connecting portion 16, arranged for removably engaging with a respective drive (which is not illustrated) of a rotating drive shaft provided on the tool holder turret 2.

The shaft 6 is rotatably fixed to the support plate 4 and is supported in rotation by first bearings 17.

In use, when the connecting portion 16 engages the drive, the shaft 6 is rotated around the axis R by the drive of the turret 2.

The second portion 4b can have a plan shape that is substantially like a circular sector portion.

Also on the second portion 4b a second through hole 20 can be provided that is sized for the insertion of a pinion 14 of a drive arrangement, as will be explained below. The pinion 14 is constrained to rotate around a further rotation axis R' parallel to the rotation axis R. The pinion 14 can be supported in rotation by second bearings 30.

The support body 5 can further comprise an abutting element 21 mounted on an end of the second portion 4b. The abutting element 21 can extend in a direction parallel to that of the rotation axis R. The abutting element 21 can have a plan shape that is substantially like a circular segment portion.

Figure 4A:
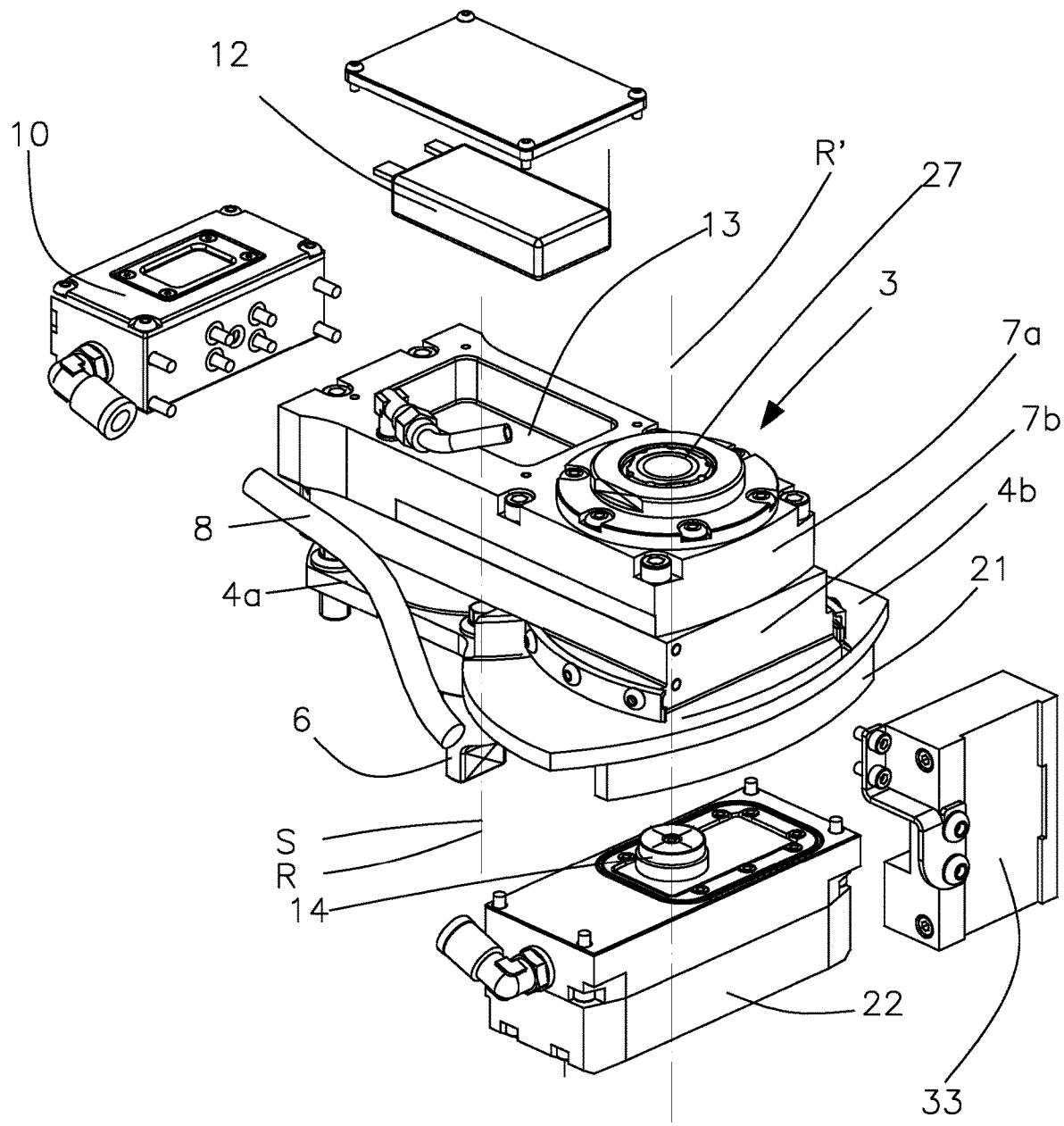
FIG. 4A shows an exploded view of the tool holder of FIG. 3A.

The abutting element 21 is mounted on a face of the support plate 4, for example it can be mounted on the lower face of the support plate 4 as illustrated in FIG. 4A, in particular in a position corresponding to the end of the second portion 4b. The phrase "in a position corresponding to" means that, when the support plate 4 and the abutting element 21 are superimposed, the circular end edges of the second portion 4b are concentric with the circular edges of the aforesaid abutting element 21.

With reference to the rotation axis R, on the lower face of the first portion 4a, substantially along the profile of the portion 4a, there is a plurality of through holes sized for inserting fixing screws or pins for removably fixing the support plate 4 to a support surface of a station of the turret 2.

Along the profile of the face of the portion 4b a plurality of through holes can be provided that are sized for inserting further fixing screws or pins for removably fixing a box body 22 to the support body 5, in particular to the lower face of the second portion 4b.

The box body is intended to house the drive arrangement, as will be explained below.

The tool holder 1 can further comprise a main body 7 connected to the support body 5. The main body can be rotatable with respect to the support body 5 around an axis S, in this embodiment coinciding with the rotation axis R.

The main body 7, of substantially box shape, comprises a first element 7a and a second element 7b fixed, for example by a threaded connecting arrangement of known type, to the aforesaid first element 7a.

Both the first element 7a and the second element 7b can have a substantially prismatic shape, for example with a rectangular base; other forms can nevertheless be provided that are not illustrated.

With reference to the rotation axis S, a housing plate 23 can be removably fixed to a lower face of the second element 7b, for example by a threaded connecting arrangement of known type.

The housing plate 23 is intended to house a sector gear 15. On the housing plate 23 an opening 24 is in fact provided sized for inserting the sector gear 15 intended to engage and mesh with the pinion 14, as will be explained below. The sector gear 15 can be fixed in the aforesaid opening 24 by a threaded connecting arrangement of known type.

In an embodiment which is not illustrated, the opening 24 can be obtained directly on the main body 7a, if the aforesaid main body is not provided with the housing plate 23.

In the mounted configuration, the housing plate 23 can abut on the upper face of the second portion 4b of the support plate 4 of the support body 5.

On the second element 7b a third through hole 25 can be provided and in a position corresponding to the first hole 19. The phrase "in a position corresponding to" means that, if the second element 7b and the support plate 4 are superimposed, the centers of the first hole 19 and of the third through hole 25 are aligned on a straight line perpendicular to the second element 7b and to the support plate 4, i.e. are aligned along the axis R.

The third through hole 25 is also sized for the insertion of the shaft 6; in particular the aforesaid third through hole 25 has a suitable diameter for housing the third bearings 18 suitable for supporting in rotation the shaft 6.

A bush 26 is further provided that is arranged between the first bearings 17 and the third bearings 18, mounted for further supporting in rotation the shaft 6.

The first element 7a is mounted, as disclosed previously, on the second element 7b.

On the first element 7a a seat 3 is obtained that is intended to house a machining tool (which is not illustrated).

In this embodiment the seat 3 is oriented in a direction parallel to the rotation of the rotation axis S (or R). The seat 3 in fact comprises a driven shaft 27 that acts as a drive for the connecting portion of the tool (which is not illustrated).

In use, when the shaft 6 is rotated by the drive of the drive shaft of the turret 2, it can rotate the driven shaft 27 by a connecting arrangement of known type.

The connecting arrangement can comprise, as in this example, a gearing, i.e. a plurality of toothed wheels (cylindrical or tapered, with straight or helical teeth) that can mesh with one another so that the movement of the one causes a movement for each of the others.

Figure 5:
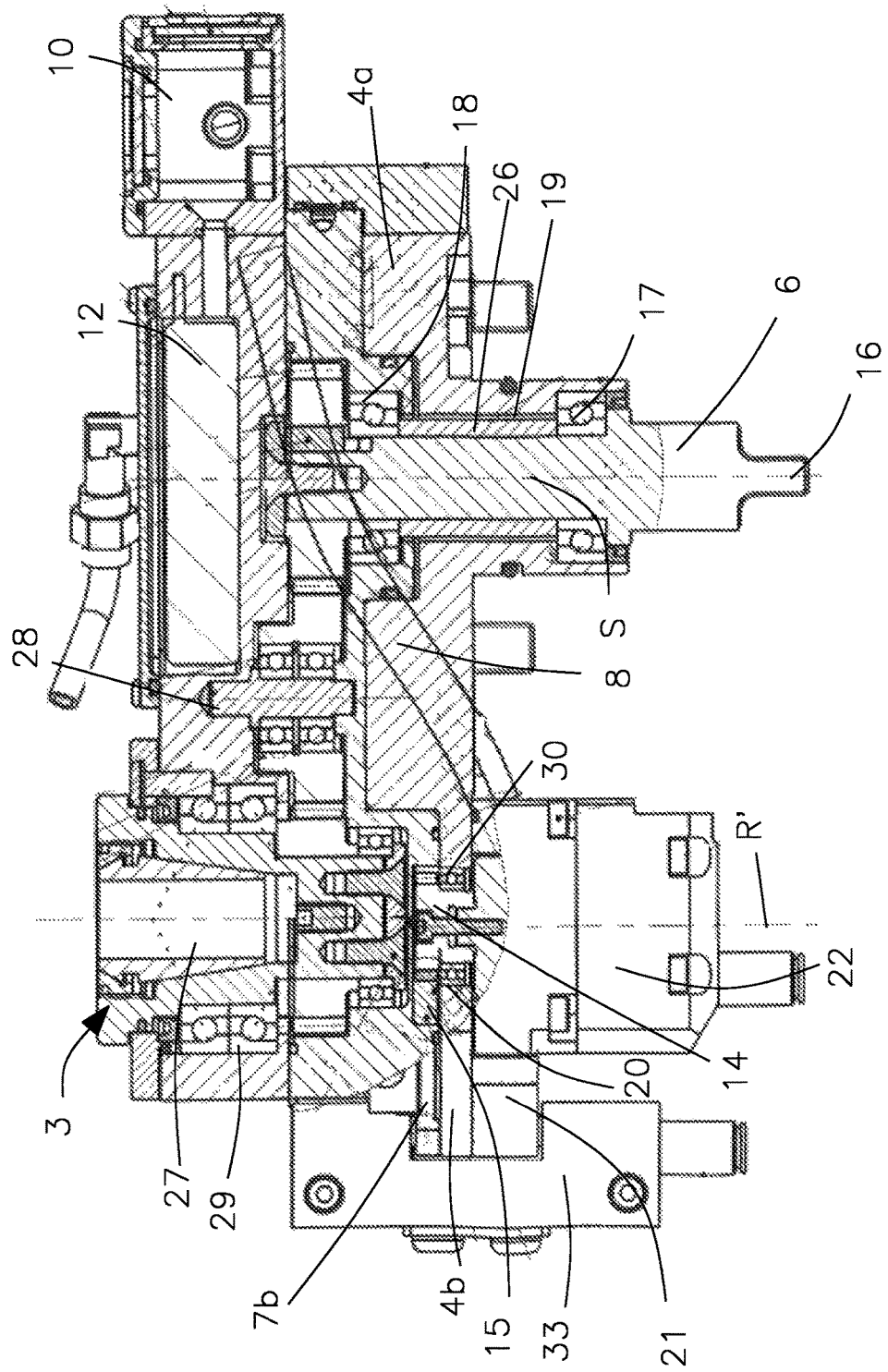
FIG. 5 shows a partially sectioned vertical raised view of the tool holder of FIG. 3A.
Figure 7B:
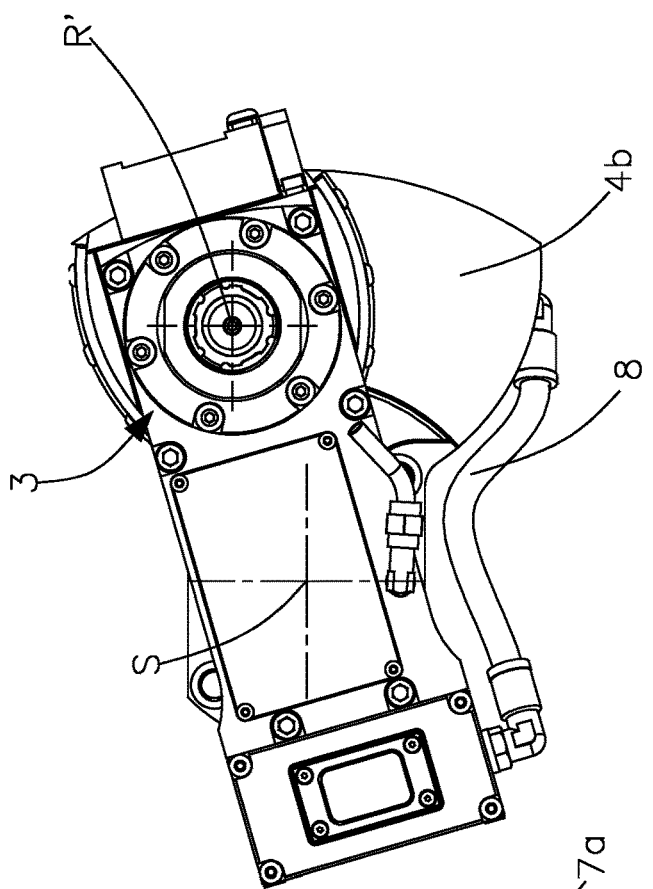
Figure 7A:
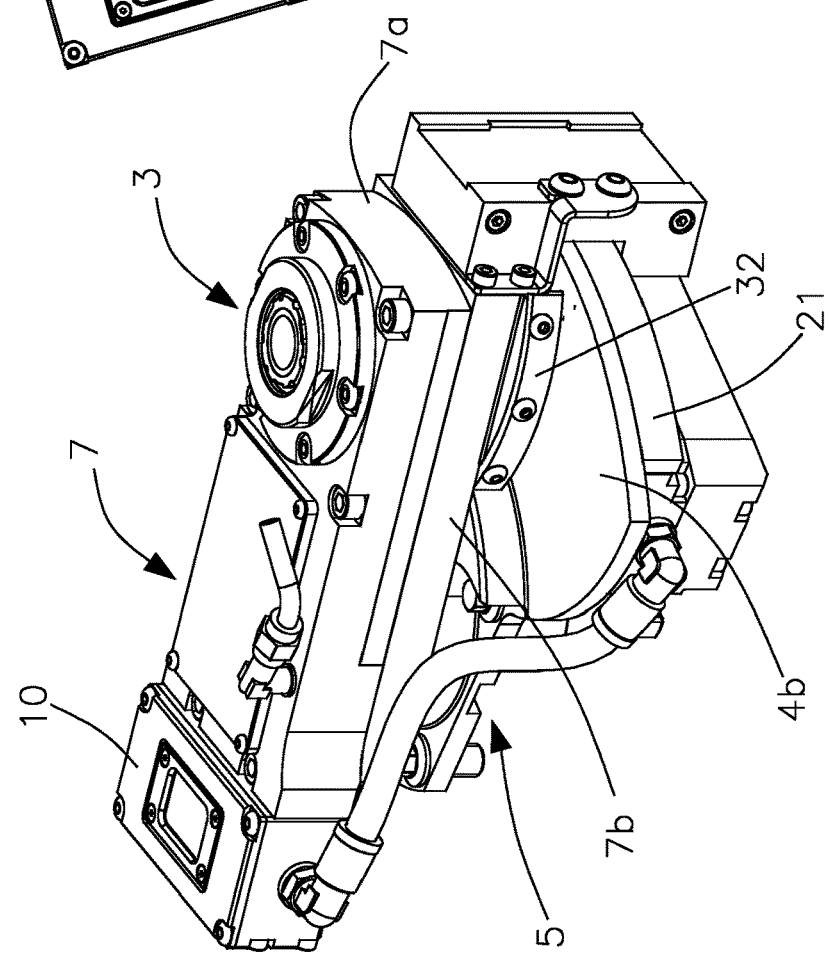

In the embodiment illustrated in FIG. 5, a first toothed wheel mounted on the shaft 6 can mesh with a second toothed wheel mounted on a freely rotating connecting shaft 28. The second toothed wheel can in turn mesh with a third toothed wheel mounted on the driven shaft 27, causing the latter to rotate. The driven shaft 27 is supported in rotation by fourth bearings 29.

The tool holder 1 can further comprise a drive arrangement that is drivable for rotating the main body 7 with respect to the support body 5 in order to position the seat 3 in a desired position, for example at a preset angular distance from a preset reference angular position.

Figure 4B:
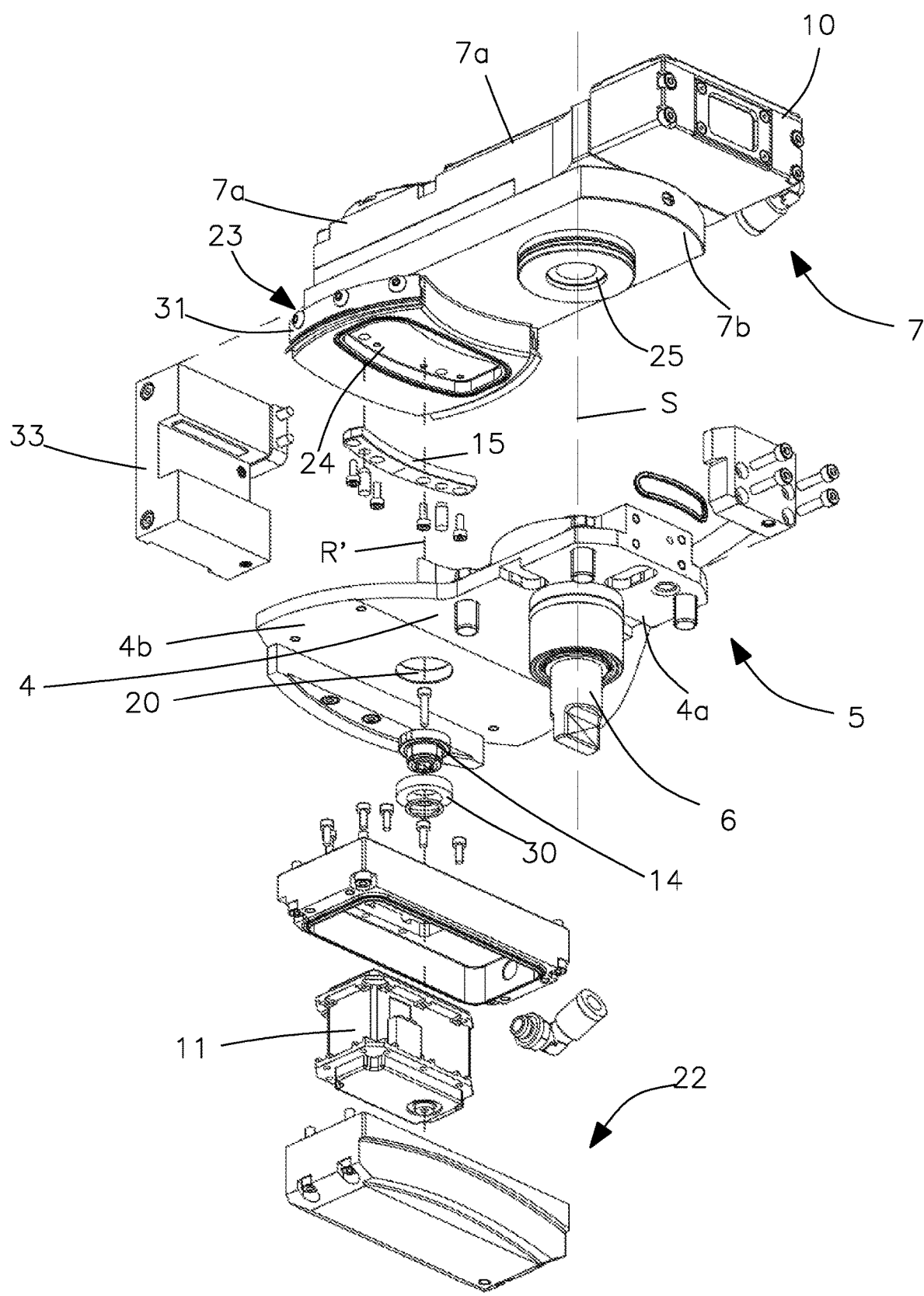
FIG. 4B shows another exploded view of the tool holder of FIG. 3B.

The drive arrangement can be a motorized drive arrangement, comprising for example a servomotor 11 arranged inside the box body 22, as illustrated in FIG. 4B.

The box body 22 can be possibly placed in fluid connection with a pressure device, for example a compressor or a fan of commercially known type.

The pressure device can be configured for applying a pressurized fluid that passes through the box body 22, in order to prevent infiltration into the aforesaid box body 22 of humidity, dirt, chips, coolant and so on.

The servomotor 11 can be of commercially known type, i.e. comprising an electric motor, speed reducing members, an output pinion 14, an electronic module and a sensor unit.

When the servomotor 11 is driven, the sensor unit is able to measure a variation of the angular position of the pinion 14 with respect to an initial angular position. The sensor unit is further configured for transducing the angular position variation with respect to the initial position into a position variation signal and then transmitting the position variation signal to an electronic module that processes the position variation signal. The electronic module can possibly comprise a microprocessor for memorizing the initial angular position of the pinion 14.

In the first embodiment, the servomotor 11 can be connected to a signal transmitting device that is removably mountable on the main body 7, in in particular on the first element 7a.

The aforesaid signal transmitting device is configured for transmitting a drive signal to the servomotor 11. The signal transmitting device can comprise at least one transceiver module 10 of known type, connected electrically to the servomotor 11.

The transceiver module 10 is moreover configured for communicating with the servomotor 11, i.e. transmitting a drive start signal to the aforesaid servomotor 11 to rotate the main body 7 with respect to the support body 5, and receiving a drive end signal from the aforesaid servomotor 11 when the rotation of the main body 7 with respect to the support body 5 is complete.

In the first embodiment the transceiver module 10 can be mounted on an end portion of the first element 7a, for example on the end opposite the end where the seat 3 is mounted. In this manner the risk is reduced that the aforesaid transceiver module 10 is chipped/ruined by contact with chips/splinters removed during machining of the workpiece.

The drive start and/or end signal is transmitted by the transceiver module 10 to the servomotor 11, or vice versa, by a conductor wire inserted inside a cable 8, positioned therebetween.

The transceiver module 10 is further configured for communicating by a Wi-Fi, NFC, or Bluetooth network with an outside source, for example a processor/computer of the numerically controlled lathe.

In the first embodiment, on the main body 7, in particular on the first element 7a, another seat 13 can be obtained sized for housing a supply device.

The supply device is arranged for supplying both the transceiver module 10 and the servomotor 11. The supply device can comprise, as in this example, a battery 12 of commercially known type. In particular, the battery 12 can be connected to the servomotor 11 by electric supply wires that are also arranged inside the cable 8. The battery 12 can be designed to have an appropriate life.

In the mounted configuration, the pinion 14 of the servomotor 11 can engage and mesh with the sector gear 15 fixed on the main body 7.

In use, the meshing between the pinion 14 and the sector gear 15 rotates the main body 7 with respect to the support body 5 around the rotation axis S between a rest position and a first angular end position and/or between the rest position and a second angular end position, as illustrated in FIGS. 6A-8B.

In use, the external source can be configured for sending a wireless drive signal to the transceiver module 10, for example to rotate the main body 7 between the rest position and the first angular end position and/or between the rest position and the second angular end position.

The transceiver module 10, supplied by the battery 12, can in turn be configured for processing the aforesaid wireless signal and sending a(n) (electric) drive start signal to the servomotor 11, by a conductor wire inserted inside the cable 8.

In particular a sequence of low voltage electric pulses is sent, by the conductor wire, to the electronic module of the servomotor 11.

The servomotor 11 can be driven, if supplied by the battery 12, by (electric) supply wires which are also arranged inside the cable 8. In this manner, the electronic module supplies with a predetermined sequence the windings of the motor, by rotating the output pinion 14 of the servomotor 11.

By inverting the sequence with which the windings of the motor are supplied, the rotation direction of the output pinion 14 can be reversed.

The teeth of the pinion 14 engage the respective teeth of the sector gear 15 that, in this manner, can be rotated by a preset angular amount from the rest position. Subsequently the main body 7 rotates with respect to the support body 5 around the rotation axis S (or R) by the aforesaid angular amount, enabling the aforesaid seat 3 to be positioned at a preset angular distance with respect to a preset angular reference position.

During rotation of the main body 7 with respect to the support body 5, the housing plate 23 of the second element 7b slides on the second portion 4b of the support plate 4, which acts as a track.

When the aforesaid seat 3 has been positioned, in particular at the desired angular distance with respect to the reference angular position, the servomotor 11 is stopped. The electronic module of the servomotor is configured for sending a drive end signal to the transceiver module 10 and the aforesaid transceiver module 10 is configured for sending a feedback signal (by WIFI, NFC, or Bluetooth) to the processor/computer of the numerically controlled lathe.

With reference to FIGS. 3A to 4B, the housing plate 23 is provided with a protection arrangement 31 suitable for preventing the introduction into the opening 24 (and thus into the sector gear 15/pinion 14 combination) of waste machining material, i.e. dust, dirt, chips and/or coolant that settle on the second portion 4b of the support plate 4 during machining of a workpiece.

The protection arrangement 31 can comprise a scraper element 32 having a shape that surrounds at least partially the housing plate 23. For example, the scraper element 32 can have an annular shape or a circular crown portion.

With reference to the rotation axis S, the scraper element 32 is provided with an edge that, in use, abuts on the upper face of the second portion 4b and prevents chips or splinters from entering from the outside.

The protection arrangement 31 further comprises a seal ring (which is not illustrated, for example an "O-ring"), further suitable for avoiding the passage of fluid/chips inside the opening 24. The O-ring can be arranged between the housing plate 23 and the scraper element 32 such that a gap is defined between the seal ring and the scraper element.

The gap can be placed in fluid connection with a pressure device (not illustrated), for example a compressor or a fan of commercially known type.

The pressure device can be configured for applying a pressurized fluid that, passing through the gap, enables the aforesaid gap to be kept clean, by removing possible chips and/or coolant that have entered.

In the embodiment shown in the aforesaid figures, the tool holder 1 can be provided with a parking brake 33 suitable for stopping the rotation of the main body 7 with respect to the support body 5.

The parking brake 33 prevents the cutting tool, in use, being moved from the preset position by the cutting forces generated.

The parking brake 33 can be mounted on the second element 7b of the main body 7 and can comprise a gripper element, provided with a fixed jaw that abuts on an end portion of the second element 7b of the main body 7 and a movable jaw intended to abut on a face of the abutting element 21 of the support body 5.

The parking brake 33 can be driven to move from a closed configuration to an open configuration. The phrase closed configuration means that, when the parking brake is mounted, the fixed jaw locks an end portion of the second element 7b of the main body 7, whilst the movable jaw abuts on and locks a face of the abutting element 21 of the support body 5.

The phrase open configuration means that, when the parking brake is mounted, the fixed jaw locks an end portion of the second element 7b of the main body 7, whilst the movable jaw disengages the face of the abutting element 21, thus enabling the main body 7 to rotate with respect to the support body 5.

Before use, the parking brake is in a normally closed configuration.

The parking brake 33 can be, for example, of pneumatic type. In other words, the parking brake 33 can be placed in fluid connection with a pressure device (not illustrated), for example a compressor or a fan of commercially known type.

In use, the pressure device can be driven to apply a pressure that permits the parking brake 33 to pass from a closed configuration to an open configuration.

On the tool holder a parking brake 33 of electric or piezoelectric type can be alternatively provided. In this case the parking brake can be connected to the supply device, for example to the battery 12, configured for supplying electric energy to move the brake from a closed configuration to an open configuration.

In other embodiments that are not illustrated, the tool holder can be devoid of a parking brake. In this case, it is possible to provide for the transceiving module communicating with the processor of the numerically controlled lathe and with the servomotor without transmission, decoding and/or processing delays. This enables the servomotor to provide a tool positioning torque that is proportional to and opposite the variable cutting torque that can be generated from the contact between the tool and the workpiece. In this manner it is prevented that during machining, even without a parking brake, the seat 3 of the tool can be moved accidentally from the position reached and/or removed in an undesired manner by the workpiece.

Figure 9:
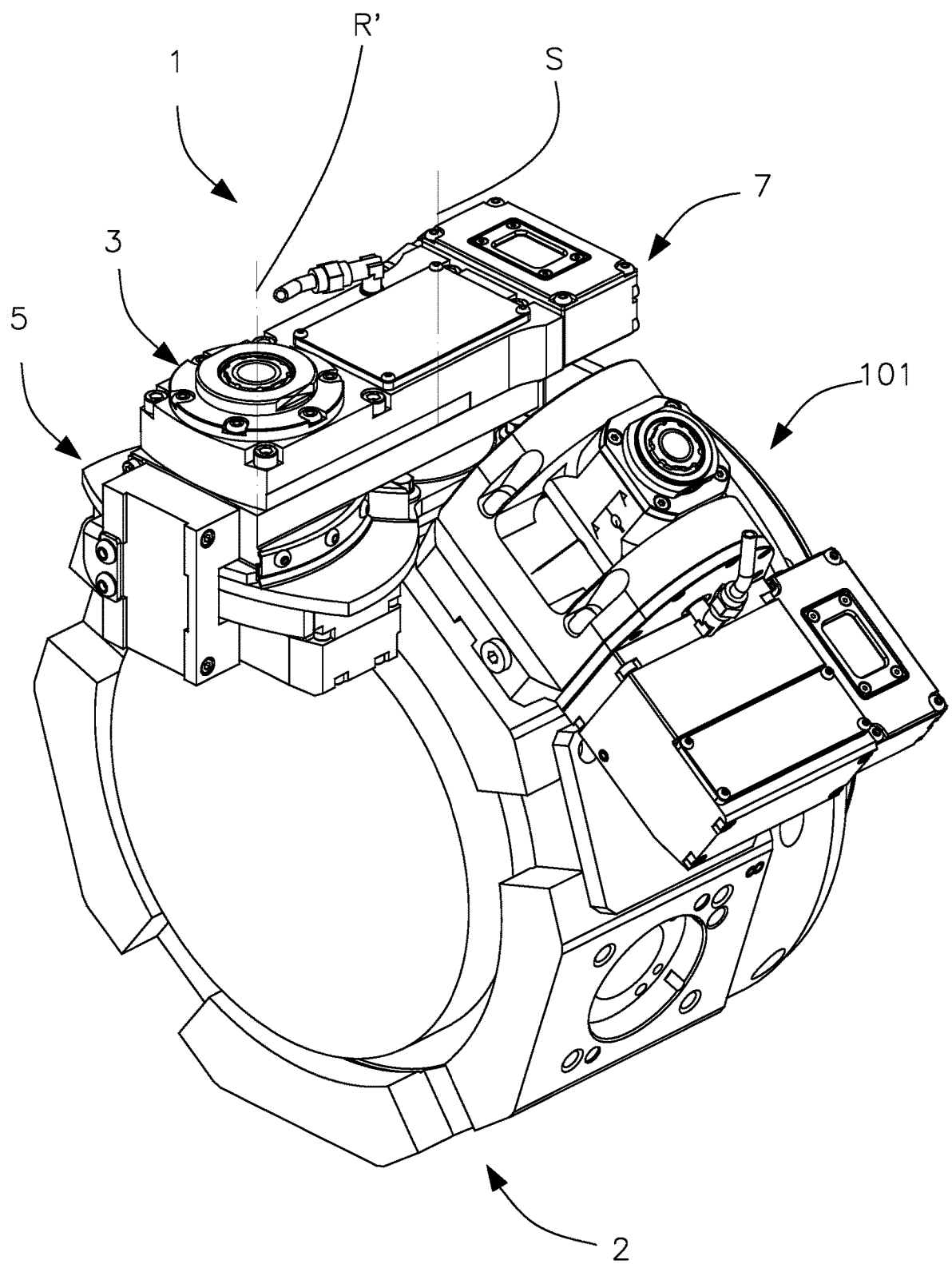
FIG. 9 shows a perspective view of the tool holder of FIGS. 3A and 3C mounted on a station of a tool holder turret of a numerically controlled machining centre.

In FIG. 9 the tool holder 1 is shown in the mounted configuration on a station of the turret 2. As is noted from the aforesaid figure, with reference to the rotation axis S (or R), the support body 5 is fixed to the turret 2; further, the lower face of the second portion 4b of the support plate 4 does not abut on the support surface of the station of the turret 2.

Figure 3A:
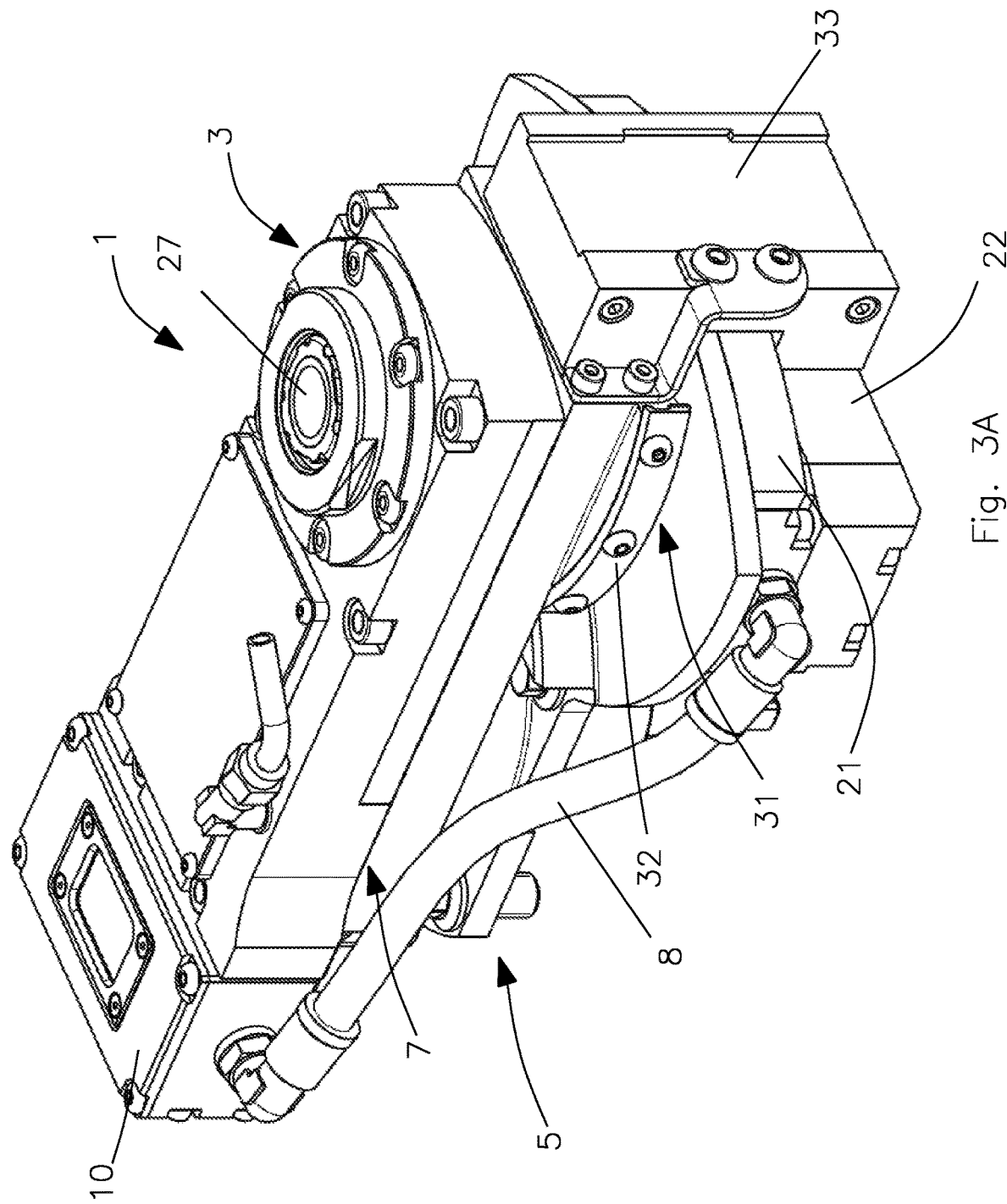
FIG. 3A shows a perspective view of a first embodiment of a tool holder according to the invention.
Figure 3B:
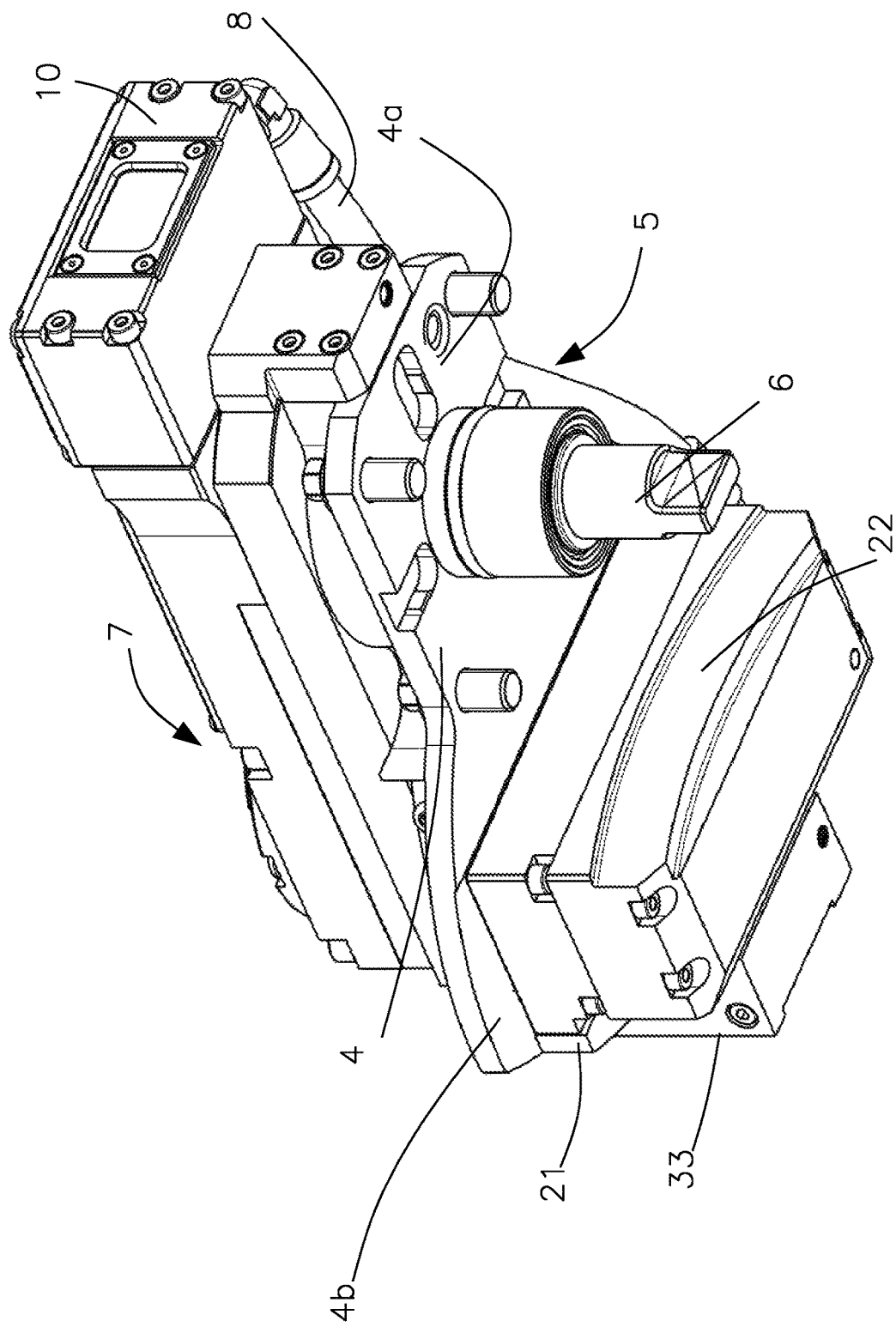
FIG. 3B shows another perspective view of the tool holder of FIG. 3A.
Figure 3C:
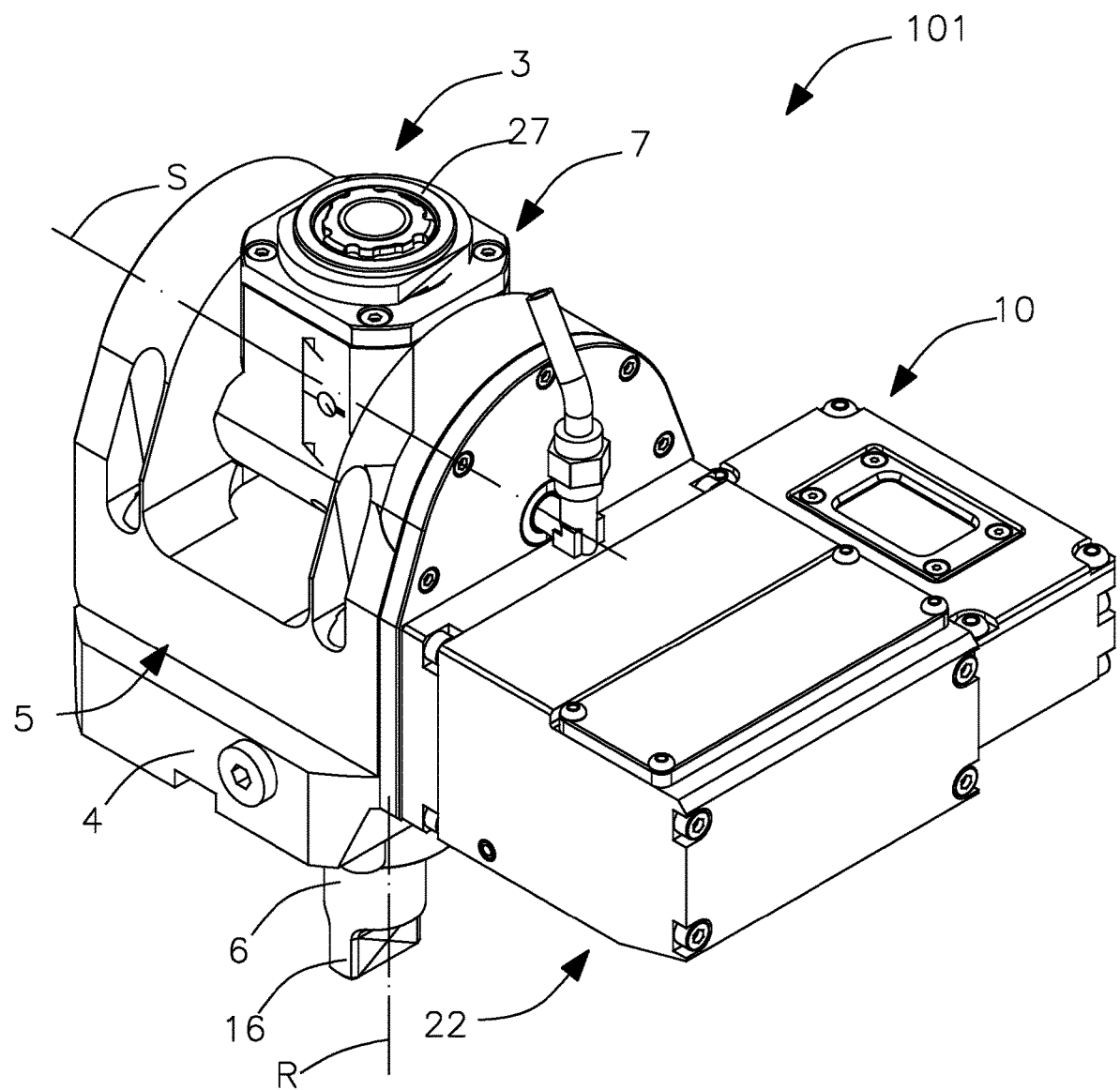
FIG. 3C shows a perspective view of a second embodiment of a tool holder according to the invention.
Figure 4C:
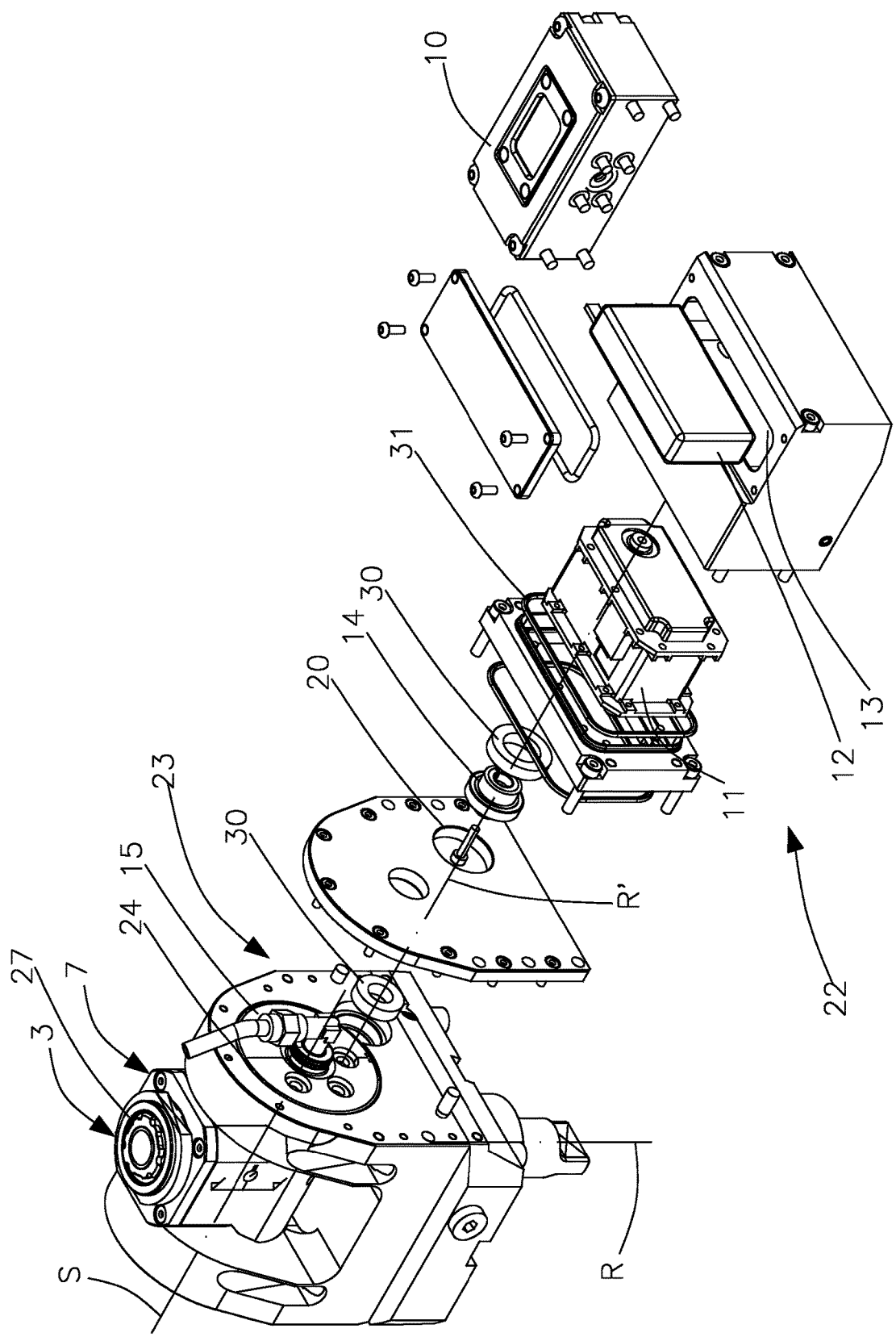
FIG. 4C shows an exploded view of the tool holder of FIG. 3C.

With reference to FIGS. 3C, 4C and 9 a second embodiment of tool holder 101 of rotating type is shown, mountable on a tool holder turret 2, of a controlled lathe that is commercially known numerically and is not shown. Elements are recognized that are common to the two embodiments, whereas in this embodiment it can be noticed that:

the rotation axis S around which the main body 7 is rotatable with respect to the support body 5 does not coincide with the axis R;

the pinion 14 is constrained to rotate around a further rotation axis R' parallel to the rotation axis S rather than R;

the seat 3 is not oriented in a direction parallel to the axis R;

the transceiver module 10 can be mounted on the support body 5 rather than on the main body 7;

the seat 13 sized for housing the supply device is obtained in the box element 22 that is integral with the support body 5 rather than the main body 7.

The tool holder turret 2 is provided with a drive (which is not illustrated) for rotating the shaft 6 of said tool holder 1, 101. The drive can be driven by a further drive arrangement (not illustrated).

The further drive arrangement can be supplied by a further supply device (not illustrated).

From what has been disclosed above it has been seen that it is possible to make a tool holder that is adjustable in an angular position independently of the drive of a cutting/drilling tool mounted there.

This is possible owing to a tool holder that comprises a motorized drive arrangement that are supplied by a supply device that is autonomous and independent of external electric connections and enables the main body of the tool holder to be rotated with respect to the support body around the rotation axis S.

This is further possible owing to a tool holder in which the drive arrangement, the signal transmitting device and the supply device are fitted and coexist in preset positions, despite the reduced dimensions and bulk of the tool holder.

The invention claimed is:

1. A rotating tool holder mountable on a revolving multi-station tool holder turret of a numerically controlled lathe or turning/milling center; said tool holder comprising:
    a support body that is removably fixable to said turret and comprising a shaft that is rotatable and releasably connectable to a drive of said turret;
    a main body connected to said support body and rotatable about a rotation axis, on said main body being obtained a seat intended to house a cutting/drilling tool, said seat comprising a driven shaft designed to rotate the cutting/drilling tool, said driven shaft being connected to said shaft to be driven in rotation;
    wherein said tool holder comprises a motor for rotating said main body with respect to said support body around said rotation axis autonomously and independently of the rotation of said shaft, in order to position said seat in a desired position, said motor being arranged directly on said support body or said main body and configured to be removably fixed to said support body or to said main body.

2. The tool holder according to claim 1, wherein said motor rotates said main body with respect to said support body around said rotation axis in order to position said seat at a predetermined angular distance from a predefined angular reference position.

3. The tool holder according to claim 1, wherein said motor comprises a servomotor.

4. The tool holder according to claim 3, wherein said servomotor is connectable to at least one transceiver that is mountable on said main body or on said support body and that is suitable for transmitting a drive signal to said servomotor.

5. The tool holder according to claim 4, wherein said transceiver and said servomotor are supplied by a battery housed in another seat obtained on said main body or on said support body.

6. The tool holder according to claim 3, wherein a housing plate is removably fixed on said main body or on said support body, in said housing plate being obtained an opening designed to house a sector gear, said servomotor being provided with a pinion designed to mesh with said sector gear to rotate said main body with respect to said support body around said rotation axis.

7. The tool holder according to claim 6, wherein said main body is provided with an element of annular shape that surrounds at least partially said housing plate and is suitable for protecting said opening from the entry from outside of processing waste material.

8. The tool holder according to claim 1, comprising a parking brake suitable for blocking the rotation of said main body with respect to said support body, said parking brake being mounted on said main body.

9. A tool holder turret provided with a tool holder according to claim 1, said turret comprising a drive for rotating a shaft of said tool holder.

* * * * *